Feb. 5, 1924. 1,482,706
I. SHORT
METHOD OF AND APPARATUS FOR TESTING GEARS
Filed Nov. 10, 1921
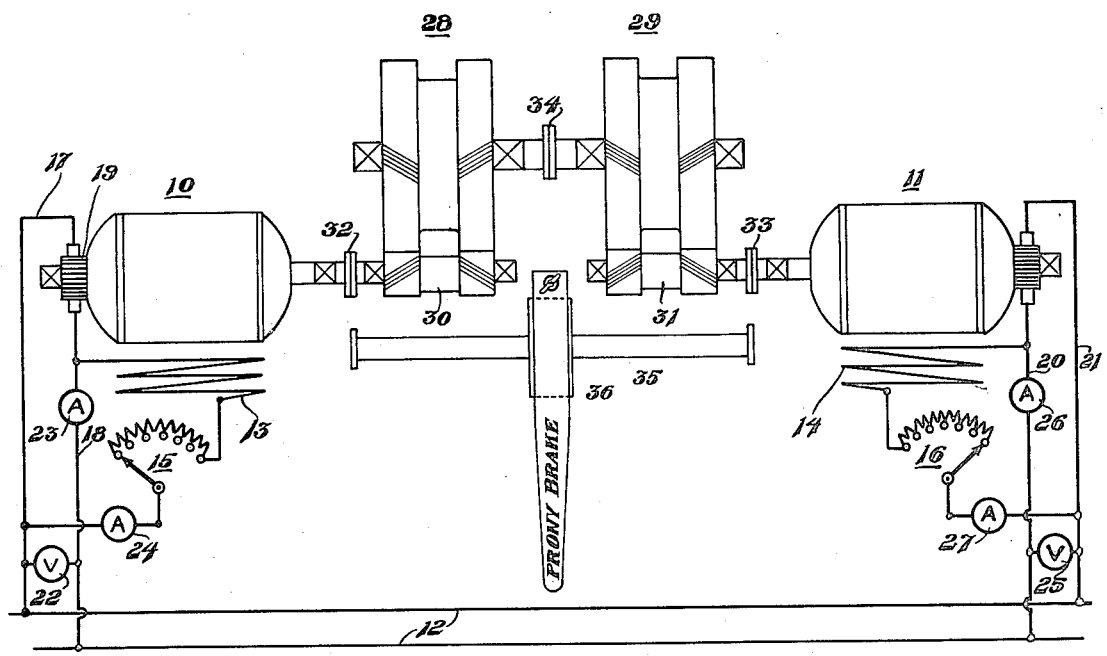
Ira Short
INVENTOR
BY A.C. Davis
ATTORNEY Patented Feb. 5, 1924.

1,482,706

UNITED STATES PATENT OFFICE.

IRA SHORT, OF ESSINGTON, PENNSYLVANIA, ASSIGNOR TO WESTINGHOUSE GEAR AND DYNAMOMETER COMPANY, A CORPORATION OF PENNSYLVANIA.

METHOD OF AND APPARATUS FOR TESTING GEARS.

Application filed November 10, 1921. Serial No. 514,380.

*To all whom it may concern:*

Be it known that I, IRA SHORT, a citizen of the United States, and a resident of Essington, in the county of Delaware and State of Pennsylvania, have invented a new and useful Improvement in Methods of and Apparatus for Testing Gears, of which the following is a specification.

My invention relates to gear-testing apparatus and it has for its object to provide apparatus of the character designated, whereby the power losses in a gear train may be readily and accurately determined with differing degrees of load.

The single figure of the accompanying drawing is a diagrammatic view of a gearing train together with associated apparatus illustrating a preferred form of my invention.

In the manufacture of large heavy gears, such, for example, as the reduction gearing for turbine-driven ships, it is frequently desirable to determine accurately and expeditiously the energy loss in the gears under differing degrees of load in order to determine the effects of slight modifications in the tooth shape, and in order to meet guarantees.

With this object in view, I propose to drive one or more sets of reduction gears by a suitable electrical motor and to load said gears in differing degrees by an electric generator, the output end of the generator preferably being connected to the input end of the motor, whereby the major portion of the energy transmitted through the gears is regenerated.

Having accurately determined the electrical input and the electrical output of the driving and loading machines, respectively, the gear train is removed and a transmission dynamometer substituted therefor, this dynamometer being capable of adjustment to impose varying loads on the system.

The dynamometer is then adjusted so as to duplicate the previously ascertained corresponding sets of input and output readings, whereupon the reading of the dynamometer indicates the gear loss under corresponding conditions.

Turning to the accompanying drawing for a more detailed understanding of my invention, I show a driving motor 10 and a loading generator 11, these machines preferably being of the direct current type provided with field windings 13 and 14, respectively, the fields being rendered capable of adjustment by suitable rheostats 15 and 16, respectively.

Energy is supplied to the motor 10 from suitable supply means 12 through leads 17 and 18, and a commutator 19.

In like manner the energy derived from the generator 11 is returned to the mains 12 through leads 20 and 21.

The input voltage to the motor 10 is determined by a voltmeter 22 and the corresponding input current by an ammeter 23, the current supplied to the field winding 13 being measured by an ammeter 24. In like manner, the output voltage of the machine 11 may be determined by a voltmeter 25, the corresponding current by an ammeter 26, and the generator field current by an ammeter 27.

It being desired to determine the energy loss in two similar sets of reduction gears 28 and 29, the pinions 30 and 31 thereof are connected respectively to the motor 10 and to the generator 11 through suitable couplings 32 and 33, the main gears of the respective gear sets being coupled at 34.

Having thus connected up the gears for test, the respective field rheostats are so adjusted as to successively load the gear train in varying amounts, respectively, up to the full rated loading of said gears, and in each case, all six meters are read, it being obvious that the reading of the voltmeters 22 and 25 will be substantially the same provided the two machines are connected to the mains 12 at closely adjacent points, but it being obvious that the readings of these voltmeters may be widely different if the output energy is not regenerated, as shown, but is supplied to an independent load such as a water rheostat.

By the use of the regenerative connection through the mains 12, it is obvious that only a relatively small amount of energy need be derived from an external source for the operation of the system.

It will be obvious that the difference between the electrical input and the electrical output as above determined, includes not only the gear losses, but also the mechanical and electrical losses of the two machines, and it is now, therefore, necessary to eliminate these latter losses, preferably by the following method.

The couplings 32 and 33 are opened and the gear train removed. A length of shafting 35 is connected directly between the motor and generator shafts, this shafting carrying a Prony brake 36.

The field rheostats are then adjusted to duplicate the previously ascertained sets of corresponding inputs and outputs, the Prony brake also being adjusted to aid in securing exact duplication of each previously ascertained set of readings.

Under these conditions, it will be obvious that the mechanical and electrical losses of the two machines will be exactly as before and the reading of the Prony brake will indicate solely the mechanical losses of the gearing, in each instance.

Inasmuch as the gearing losses will in any case represent but a very small portion of the total energy transmitted through the system, it will be obvious that extreme care must be taken in determining the respective readings. Thus, under any circumstances, the motor and generator should be run for a sufficiently long time to have attained a substantially constant temperature and the room temperature should be the same when taking brake readings as when taking gear readings.

It will be obvious that a wattmeter might be substituted for the ammeter 23 and the voltmeter 22, and similarly a wattmeter might be substituted for the ammeter 26 and the voltmeter 25, but it is preferable to employ the ammeters as shown, inasmuch as the armature heating losses in the respective machines vary with a square of the current, and it is desirable, therefore, to know the current value in each case.

It will be apparent that, assuming a constant room temperature, calibration runs may be made with the Prony brake and curves determined, which will enable the testing of subsequent gear sets without the reintroduction of the Prony brake and shaft 35.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. The method of determining the mechanical losses in a gear train which comprises connecting gear train between a driving means and a loading means, in determining the difference betwen the energy applied by the driving means to the gear train and by the energy applied by the gear train to the loading means, and in returning at least a portion of the energy applied to the loading means to the driving means.

2. The method of determining the mechanical losses in a gear train which comprises electrically driving said train, imposing an electrical load thereupon, determining the difference betwen the electrical input and the electrical output, and returning the electrical output to the input end, whereby only the total losses of the gear and measuring system need be supplied subtracting therefrom the driving and loading losses.

3. The method of determining the mechanical losses in a gear train which comprises driving said train with an electrical motor, loading said train with an electric generator determining the difference between the electric input and the electric output and subtracting therefrom the motor and generator losses.

4. The method of determining the mechanical losses in a gear train which comprises driving said train with an electrical motor, loading said train with an electric generator, determining the difference between the electric input and the electric output, subtracting therefrom the motor and generator losses and returning the electric output to the input end.

5. The method of determining the mechanical losses in a gear train which comprises driving said train with an electric motor, loading said train with an electric generator, determining the electrical input and output of the respective machines, substituting a transmission dynamometer capable of providing variable load for said gear train, adjusting said dynamometer so that the electrical input and electrical output are as before, and reading from the dynamometer the loss corresponding to the prior gear loss.

6. The method of determining the mechanical losses in a gear train which comprises driving said train with an electric motor, loading said train with an electric generator, determining the electrical input and output of the respective machines, compensating for motor and generator losses, and returning the output of the generator to the motor.

7. The method of determining the mechanical losses in a gear train which comprises driving said train with an electric motor, loading said train with an electric generator, determining the electrical input and output of the respective machines, directly connecting said machines through a shaft provided with a Prony brake, adjusting said brakes so that the electrical input and output are as before and reading from the brake the loss corresponding to the prior gear loss.

8. The method of determining the mechanical losses in a gear train which comprises driving said train with an electric motor, loading said train with an electric generator, determining the electrical input and output of the respective machines, directly connecting said machines through a shaft provided with a Prony brake, adjusting said brake so that the electrical input and output are as before and reading from the brake the loss corresponding to the prior gear loss, said electrical output being returned to the input end of the apparatus in each case.

9. The method of determining the mechanical losses in a gear train which comprises driving said train with an electric motor, loading said train to varying degrees with an electric generator, determining the electrical input and output in each case, directly connecting said machines through a shaft provided with a Prony brake, successively adjusting said brake so as to duplicate each of the previously determined sets of corresponding input and output, and determining from the resultant reading of the Prony brake the corresponding gear loss in each case.

10. The method of determining the mechanical losses in a gear train which comprises driving said train with an electric motor, loading said train to varying degrees with an electric generator, determining the electrical input and output in each case, directly connecting said machines through a shaft provided with a Prony brake, successively adjusting said brake so as to duplicate each of the previously determined sets of corresponding input and output, and determining from the resultant reading of the Prony brake the corresponding gear loss in each case, the electric output at all times being returned to the input end of the apparatus.

11. Apparatus for determining gear losses comprising a driving motor and a loading generator adapted to drive and load the gears to be tested, respectively, electrical measuring devices connected to determine the electrical input and output of said machines, respectively, and a loading transmission dynamometer adapted to connect said machines directly together.

12. Apparatus for determining gear losses comprising a driving motor and a loading generator adapted to drive and load the gears to be tested, electrical measuring devices connected to determine the electrical input and output of said machines, respectively, a loading transmission dynamometer adapted to connect said machines directly together, and connections for returning the output of said generator to the input side of said motor.

In testimony whereof, I have hereunto subscribed my name this second day of November, 1921.

IRA SHORT.